INVENTOR.
Werner Otto Harald Kroll

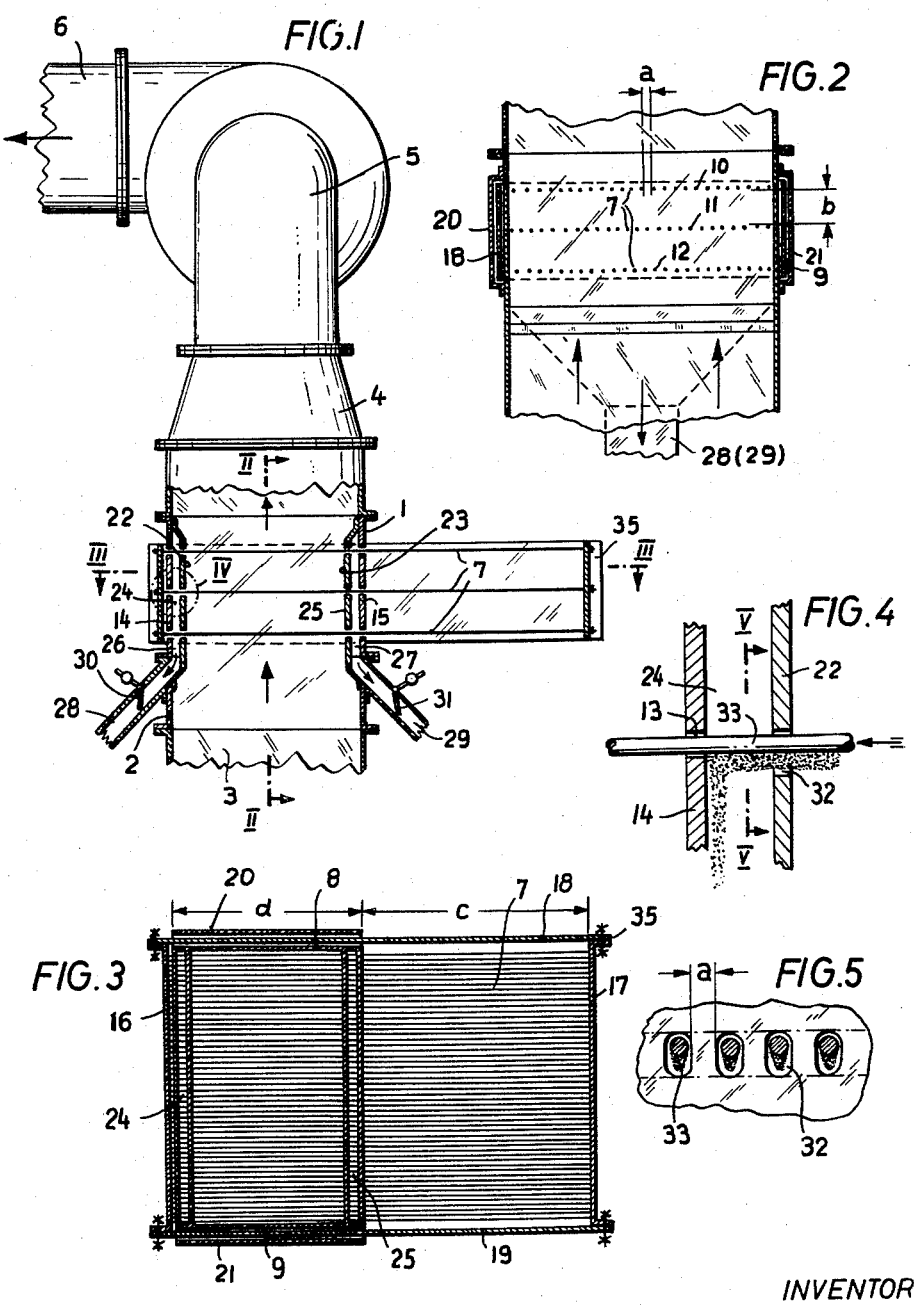

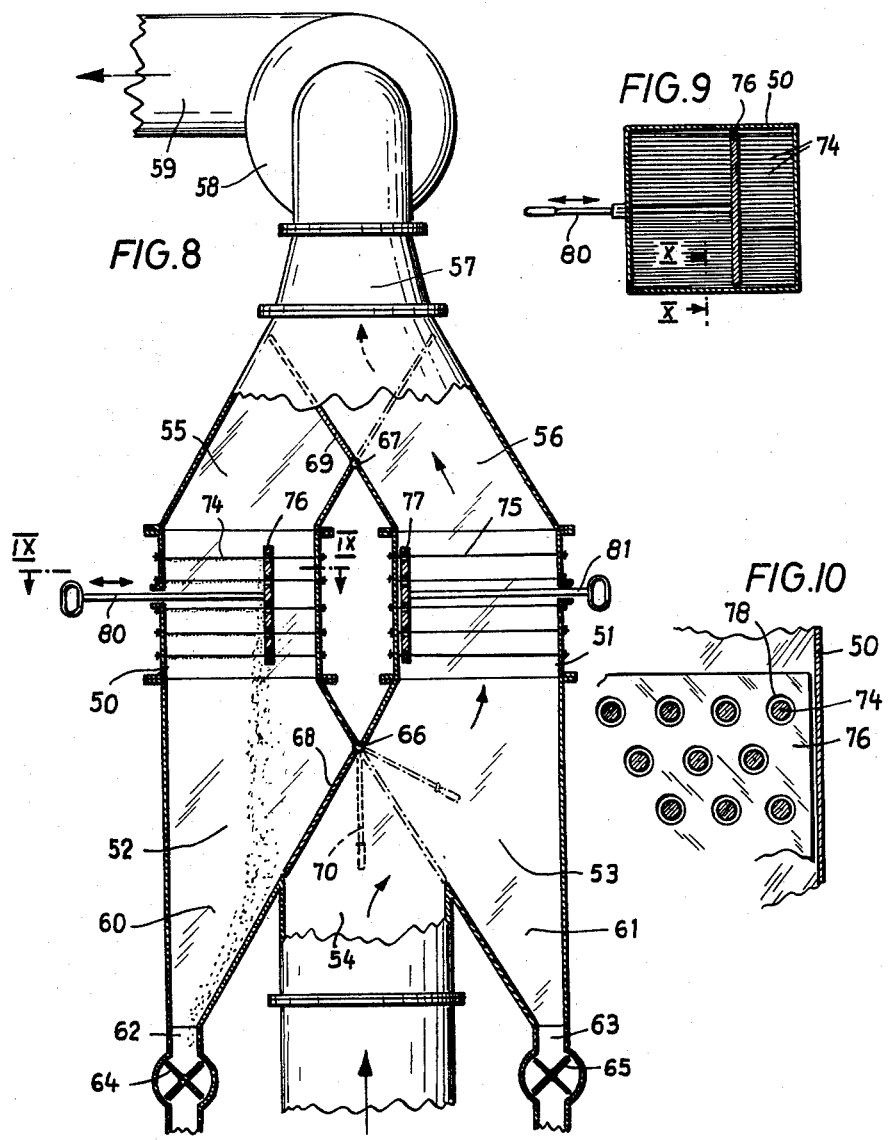

United States Patent Office 2,925,144
Patented Feb. 16, 1960

2,925,144

APPARATUS FOR SEPARATING DUST FROM GAS, PARTICULARLY HOT GAS

Werner Otto Harald Kroll, Koln-Deutz, Germany, assignor to Klöckner-Humboldt-Deutz Aktiengesellschaft, Koln-Deutz, Germany, a corporation of Germany Application February 7, 1956, Serial No. 564,079

Claims priority, application Germany February 9, 1955

15 Claims. (Cl. 183—52)

My invention relates to separators for removing dust from gas and has for its main object to devise a dust filtering apparatus which is insensitive to high temperatures and combines simple mechanical construction with good separating efficiency and particular ease of cleaning.

To this end, and in accordance with a feature of my invention, I provide a housing with respective connections for the supply of dust-laden gas and the discharge of clean gas, and I dispose in the housing a multitude of elongated filter elements, such as wires, strips or rods of material, in spaced relation to one another. The elements are distributed over the entire cross section of the housing and are located in several planes likewise spaced from one another. I further provide the assembly of wire- or rod-shaped filter bodies with devices, for instance strippers or scrapers, for removing the collected dust adhering to the filter bodies. In the following description the filter bodies, regardless of their particular shape or size, are briefly referred to as "wires."

The invention is based upon the recognition that dust particles will deposit themselves upon the surface of a body impinged upon by a flow of dust-laden gas. This occurs to a greater degree the higher the velocity of the gas flow. The reason for this phenomenon resides in the fact that at high gas velocities the inertia of the dust particles to changes in flow direction is so large that the gas is no longer capable of carrying the dust particles around the body. Consequently, with a correspondingly rated high velocity of gas flow, even very fine dust particles are separated and deposited upon the body. Qualitatively the degree of separation thus obtainable can be expressed by the term $$\frac{v_s \cdot V}{g \cdot D}$$

wherein $v_s$ is the sinking velocity of a dust particle in stationary air, $V$ the gas velocity, $g$ the gravity acceleration, and $D$ the diameter of the separator body.

In apparatus according to the invention the dust-laden gas, on its path through the housing, impinges upon the wires. Each individual wire thus represents a body located within the gas stream as explained above. Therefore, if the gas velocity is chosen correspondingly high and if a sufficient number of wires or rods are provided, the dust can be caused to precipitate virtually completely upon these bodies. Since the wires are provided with devices for removing the precipitated dust therefrom, the periodically required cleaning of the filtering apparatus is very simple.

The foregoing and more specific objects, advantages and features of the invention, such features being defined with particularity in the claims annexed hereto, will be apparent from the two embodiments illustrated by way of example on the accompanying drawings in which:

Fig. 1 shows a filtering apparatus partially in cross section.

Fig. 2 is a partial cross section taken along the line II—II in Fig. 1.

Fig. 3 is a section taken along the line III—III in Fig. 1.

Fig. 4 shows in section and on a larger scale the area denoted by IV in Fig. 1.

Fig. 5 is a cross section along the line V—V in Fig. 4.

Fig. 8 shows in longitudinal section an apparatus for separating dust from gas with two filters in which the wires are mounted stationarily.

Fig. 9 is a cross section along the line IX—IX in Fig. 8; and

Fig. 10 is a cross section along the line X—X in Fig. 9.

Figure 6:
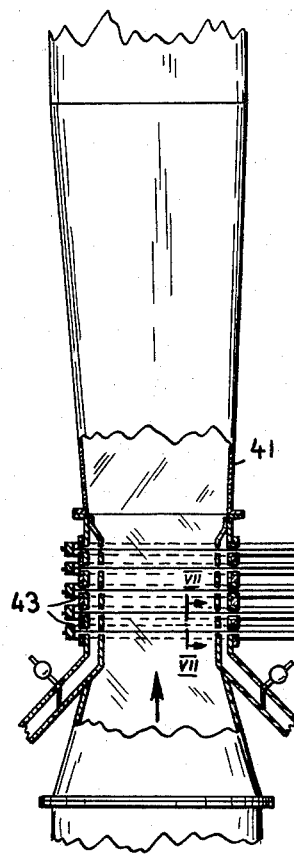
Fig. 6 illustrates a part sectional view of another dust filter apparatus.

The filter according to Fig. 1 has a sheet-metal housing 1 of rectangular cross section. The housing has a bottom duct 2 for the supply of hot dust-laden air from a supply conduit 3. The top of housing 1 is provided with a connecting duct 4 for the discharge of the dust-free gas. Duct 4 is joined with the suction inlet of a blower 5 whose pressure outlet communicates with the open air through a conduit 6. A large number of wires 7 of circular cross section extend through the housing 1 in parallel relation to the narrow walls 8 and 9 of the housing. The wires 7 are spaced from each other and are uniformly distributed over the entire cross section of the housing and disposed in a number of different planes. Although, for simplicity, only three arrays of wires in planes 10, 11, 12 are shown on the drawing, a larger number of such arrays or planes is generally needed, and five to fifty or more such arrays of wires may be provided. The diameter of the individual wires is in the range between about 0.5 to 20 mm. and is preferably made larger with increasing coarseness of the dust to be separated. The spacing $a$ (Fig. 5) between each two adjacent wires within the same plane is preferably made equal or somewhat larger than the wire diameter, and the spacing $b$ (Fig. 2) between two adjacent planes is preferably made a multiple of, for instance three times as large as, the diameter. It is further preferable to arrange the wires so that the wires in one plane are displaced relative to the wires of the neighboring planes by one-half of the spacing $a$.

The wires 7 pass through holes 13 in the longitudinal walls 14 and 15 of the housing 1 with sufficient clearance to be readily displaceable in the longitudinal direction of the wires. The drawing (Figs. 1, 3) shows the wire assembly in its right-hand position. As illustrated, the wire assemblies have such a length that the portion $c$ (Fig. 3) projecting out of the filter space in the housing is somewhat longer than the portion $d$ located within the housing 1. Preferably, and as shown, the wires 7 have their ends attached to respective transverse bars 16, 17 of a frame structure 35 whose longitudinal bars 18 and 19 are displaceably mounted in lateral guides 20, 21 of housing 1. Mounted within the housing 1 are walls 22, 23 which, together with the longitudinal and transverse walls of housing 1, enclose lateral spaces 24 and 25. The top of each partition wall 22, 23 is curved toward engagement with the longitudinal walls of housing 1 thus upwardly closing the spaces 24 and 25. The bottoms of spaces 24 and 25 form respective connecting ducts 26 and 27 for discharging the dust into respective dust outlet pipes 28 and 29.

A valve 30 or 31 is preferably mounted within each of dust discharge pipes 28 and 29 and is loaded or weighted in the closing sense. The partitions 22, 23 are provided with holes 32 for the passage of the wires 7. The holes 32, as shown in Fig. 5, have elongated shape and are made so large as to offer ample clearance to the wires especially in the downward direction. Instead of providing a row of holes 32 according to Fig. 5, each partition may also be provided with a single slot of corresponding width extending horizontally over the entire length of each array of wires of a single plane.

During operation of the filter apparatus, the blower 5 operates to force dust-laden hot gas, for instance exit gas from a heating device for cement raw material, from gas supply conduit 3 through housing 1. On its path through the housing the gas impinges upon, and flows around, these wires. With a sufficiently high velocity of the gas flow, the entrained dust precipitates in the manner described above onto the lower side of the wires impinged upon by the gas. The gas thus liberated from the dust passes subsequently through the components 4, 5 and 6 into the ambient air. In time, the dust deposits itself upon the wires as shown in Fig. 5. As is apparent, the gaps between the individual wires remain fully open during normal operation. Thus the gaps are always available without hindrance for the passage of the gas. Hence, the resistance to the flow of gas through the housing remains substantially constant and does not appreciably increase due to deposition of dust as is the case with other mechanical filters.

As explained above, the velocity of the gas guided toward the filter wires depends upon the grain size of the dust and is made larger with a finer grain size. For instance, if the dust has a medium grain size of 3 microns, a very good dust separation is obtained with a gas velocity of 7 meters per second. With dusts of the just mentioned grain size, a diameter of the wires of approximately 3 mm. is well suitable.

The operating condition reached according to Fig. 5 is such that the wires are so much occupied by dust that a further increase in dust deposition would impair the separating operation. If this condition is reached, the frame 35 with wires 7 is displaced into the left-hand limit position in which the cross bar 17 abuts against the longitudinal wall 15 of the housing 1 and the portion c of the wires is located in the interior of the housing. Now a clean portion of the wires is available for the separation of dust from gas. During displacement of the frame 35 the dust carrying portions d of the wires 7 are cleaned simultaneously. The cleaning operation is apparent from Fig. 4. It will be recognized that the holes 32 in partition 22 are so large that not only the wires 7 but also the adhering dust can freely pass through. In contrast, the holes 13 in the longitudinal wall 14 are only as large as is needed for the passage of the wires, but they are not large enough for passage of dust. As a result, the dust is scraped off as the wires pass through partition wall 22. The dust drops through space 24 and collects upon the valve 30 (Fig. 1). The closing moment of valve 30 is so adjusted that a certain amount of dust is always collected in the outlet duct 28. This secures a good seal against the escape of gas through the dust discharge pipe 28. If after a certain time the wires 7 within housing 1 are again so much loaded with separated dust that an effective dust separation becomes doubtful, the frame 35 is moved back to the right-hand limit position so that the above-described cleaning operation will again occur analogously. Consequently the filter apparatus has also the advantage that the dust separating operation remains continuous rather than being interrupted by the periodically required cleaning of the filter wires.

Figure 7:
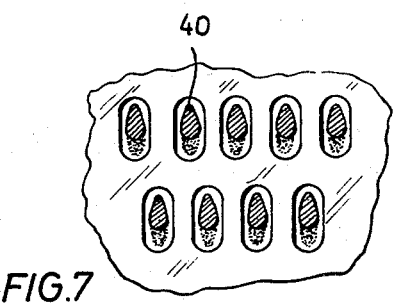
Fig. 7 shows on larger scale a partial cross section along the line VII—VII in Fig. 6.

The filter apparatus illustrated in Fig. 6 is particularly designed for the removal of dust from gas which carries dust of very fine grain size and consequently must be blown against the wires at a very high velocity. As shown, the wires 40 of the filter are arranged in the narrowest cross section of a nozzle-shaped housing 41. Such a shape of the filter housing makes it possible to economically attain very high gas velocities. Also with reference to the very high gas velocity, the wires 40 are preferably given a streamlined cross section as shown in Fig. 7. Such wires offer to the gas flow a considerably smaller resistance than, for instance, those of circular cross section. According to Fig. 6 the wires of each plane or array are mounted in an individual frame 42. Each individual frame can readily be displaced by hand. However, as in the embodiment in Figs. 1 to 5, all wires may also be mounted in a common frame. Then the displacement of the frame is preferably effected by means of a motor which, for instance, may drive a pinion meshing with a rack on the frame structure.

The filter according to Fig. 6 further differs from the one described previously in that gaskets or seals 43, for instance of asbestos, are provided at the places where the wires 40 emerge out of the housing 41. This affords the assurance that at these places no air is inducted from the outside into the housing. Of course, such sealing means may also be provided in filter apparatus otherwise according to Figs. 1 to 5.

While we prefer having the filter wires displaceably mounted as described with reference to the illustrated embodiments, the wires may also be stationarily mounted in the filter housing as shown in Fig. 8. In this case a movable scraper 80 is used for cleaning the wires. The scraper may be disposed within the housing and moved back and forth from the outside. Such a scraping device may simply consist of a plate 76 with holes traversed by the wires. For continuous dust removing operation two such filters are required. They are connected to a common supply conduit 54 for the dust-laden gas and also to a common discharge conduit for the discharge of the clean gas. Besides, the apparatus is provided with flap valves so that the gas can be selectively passed either through the one or through the other filter. When the wires of the filter first traversed by the gas are so greatly loaded with separated dust as to require cleaning, then this filter is switched from the supply and discharge conduits for the gas by correspondingly turning the valve flaps; and instead the other filter is placed in operation. The filter wires of the first filter are cleaned by displacing the scraper plate. The dust scraped off the wires then drops through the housing and is collected in a pocket located at the bottom of the filter. Subsequently the collected dust can be removed from the pocket. Thereafter the filter first used is again ready for operation. When after a certain time the wires of the second-used filter require cleaning, then they are separated by means of the valve flaps from the supply and discharge conduits for the gas, and the first-mentioned filter is again placed into operation. The cleaning of the second filter is then performed in analogy to the cleaning operation described above.

In a filter according to the invention the wires of the planes or arrays first impinged upon by the gas are most strongly occupied by separated dust. Consequently, the wires of the subsequent planes are still capable of receiving dust when the wires of the forward plane or planes must already be cleaned. For that reason it is preferable to give the wires in the forward planes a larger cross section than, for instance twice the cross section of, the wires in the subsequent planes, the latter wires having their cross section dimensioned in dependence upon the grain size of the dust to be separated. Obviously, when the streamlined baffles or wires of Figure 7 are employed, the transverse thickness is the dimension that is determined in dependence upon the grain size. When baffles or wires of circular cross-section are used the criterion is the diameter, or the cross-sectional area, which is proportional to the diameter. Since thicker wires can receive more dust than thinner ones, care is taken in this matter that all wires are utilized to an approximately uniform extent so as to require approximately the same period of operation before they become so fully loaded with dust as to require cleaning. Besides, thick wires, spaced from each other a distance about equal to their diameter, offer to the passage of gas a lesser resistance than thin wires likewise spaced from each other a distance corresponding to their diameter. Obviously, this applies to both circular and streamlined baffles. Consequently, a filter whose wires are all dimensioned in accordance with the grain size of the dust to be separated involves more pressure losses than a filter in which the forward filter planes are occupied by wires thicker than required. Furthermore, the thicker wires of the forward planes receive mainly the precipitation of coarser dust particles whereas the finer particles precipitate to a larger extent onto the thinner wires of the rearward planes. The provision of thicker wires in the forward planes as compared with the wires in the subsequent planes is therefore also of advantage in cases where the gas entrains dust particles of greatly different grain sizes.

Since, as mentioned, more of the coarser dust particles will adhere to the wires of the forward planes and more finer particles on the wires of the rearward, and since further for the separation of the coarser particles a lower gas velocity is needed than for the separation of the finer particles, it is further of advantage to pass the gas through the filter at a velocity increasing from the forward toward the rear planes. Such increase in gas velocity can be obtained readily, for instance in a filter according to Figs. 1 to 5, by having the cross section of the housing 1 decrease continuously from the lower toward the upper plane of the assembly of filter wires.

In further relation to Fig. 8, each of the two filters of this apparatus has a housing 50 and 51 of rectangular cross section. The bottom portion of each housing forms a connecting duct 52, 53 for the supply of dust-laden gas from the common supply conduit 54. The top portion of each housing forms a connecting duct 55, 56, through which the cleaned gas is discharged into a common outlet conduit 57. Conduit 57 communicates with the suction side of a blower 58, whose pressure outlet communicates with the open air through a conduit 59. Each of the ducts 52 and 53 is provided respectively with a pocket 60, 61. The bottom portion of each pocket is provided with a discharge pipe 62, 63. A rotary valve 64, 65 is mounted within each of the pipes. At the edges 66, 67 where the ducts 52, 53 and 55, 56 of the two housings are joined with each other valve flaps 68, 69 are provided. The flaps are interconnected (not shown) so that they can be placed simultaneously from the outside by aid of a hand lever 70 into the full line or the dot-and-dash line positions. As shown, in the full line positions the left-hand filter is separated from the conduits 54 and 57 whereas the right-hand filter is connected with said conduits. The flaps permit an alternating operation of the two filters, thus allowing the dust-laden gas to pass selectively either through the one or the other filter.

Inside each housing a large number of wires 74, 75 is provided. At their ends the wires are firmly connected with the walls of the housings. For cleaning the wires in each housing a movable scraper 76, 77 is disposed. It consists of a plate with holes 78 (Fig. 10). Each wire passes with clearance through a hole of the plate. Furthermore a rod 80, 81 which passes through the housing is fastened to each scraper. By aid of the rods the scrapers can be moved to and fro on the wires.

During operation of the apparatus the flaps are in the full line positions or in the dot-and-dash line positions, so that the dust-laden gas passes through one of the two filters. With sufficient high velocity of the gas flow, the entrained dust precipitates as described on the wires of this filter. When the wires are so greatly loaded with separated dust as to require cleaning, then the flaps are turned, so that the other filter is placed in operation whereas the first filter is separated from the gas conduits 54, 57. Thereafter the scraper 76 of this filter is moved to and fro by the rod 80. By this the dust is scraped off from the wires and drops into the pockets 60. Subsequently the dust is removed by aid of the rotary valve 64 out of the pocket. Thereafter the filter is again available for dust removing operation.

I claim:

1. Apparatus for the mechanical cleaning of dust-laden gas, comprising a housing having an inlet portion for dust-laden gas and an outlet portion for cleaned gas, said housing having between said two portions a zone of a narrower cross section than said portions so as to form a nozzle structure together with said portions, filter means disposed in said zone of said housing and comprising arrays of parallel free wires spaced from each other within each said array and distributed over the cross section of said housing zone, said arrays being located in different respective planes spaced from each other between said inlet and outlet portions, and scraper means mechanically engageable with said respective wires for removing adhering dust therefrom, said wires being free of each other laterally to provide free access thereabout of the scraper means.

2. Apparatus for the mechanical cleaning of dust-laden gas, particularly hot gas, which comprises a housing having an inlet portion for dust-laden gas and an outlet portion for cleaned gas, filter means transversely disposed within said housing and consisting of arrays of elongated parallel free baffle elements of curved outline spaced from each other within each array and transversely distributed over the cross section of said housing, said arrays being mounted in at least five respectively different planes spaced from each other between said inlet and outlet portions, the spacing between the elements within each plane being at least equal to the transverse thickness of the elements of that plane, the spacing between adjacent planes being a multiple of the transverse thickness of the elements of said adjacent planes, the elements of adjacent arrays being transversely displaced, the said thickness of the elements decreasing in the flow direction, cleaning means having structure mechanically engageable with the periphery of and along the length of each element, said respective filter and cleaning means being movable relative to each other for removing adhering dust from said elements, said baffle elements being free of each other transversely to provide free access thereabout of the cleaning means.

3. In gas cleaning apparatus according to claim 2, said baffles having an air-foil cross section tapering in the gas flow direction.

4. Apparatus according to claim 2, comprising a rigid frame structure on which said arrays of baffles are mounted, said frame being slidably guided on said housing for simultaneous displacement of said arrays.

5. Apparatus according to claim 2, comprising a plurality of rigid frame structures individually guided on said housing for horizontal displacement relative thereto, each said arrays of baffles being mounted on one of said respective frame structures.

6. Apparatus for the mechanical cleaning of dust-laden gas, particularly hot gas, which comprises a housing having an inlet portion for dust-laden gas and an outlet portion for cleaned gas, filter means transversely disposed within said housing and consisting of arrays of parallel free wires spaced from each other within each array and transversely distributed over the cross section of said housing, said arrays being mounted in at least five respectively different planes spaced from each other between said inlet and outlet portions, the spacing between the wires within each plane being at least equal to the transverse thickness of the wires of that plane, the spacing between adjacent planes being a multiple of the transverse thickness of the wires of said adjacent planes, the wires of adjacent arrays being transversely displaced with respect to each other, the said thicknesses of the respective wires decreasing in the flow direction, cleaning means having structure mechanically engageable with the circumference of and along the length of each wire, one of said respective filter and cleaning means being movable relative to the other for removing adhering dust from said wires, said wires being free of each other transversely to provide free access thereabout of the cleaning means.

7. Apparatus for cleaning dust-laden gas, comprising a vertical housing structure providing a housing having an inlet portion for dust-laden gas and an outlet portion for cleaned gas, said housing having between said two portions a gas cleaning zone, arrays of elongated baffles located in said zone transversely of the housing in mutually spaced horizontal planes, the baffles of each array being mutually spaced and parallel and being distributed over the cross section of said zone, said arrays being displaceable into and out of the gas cleaning zone in a direction transversely of said housing and having in said direction a total length at least twice the length of the array portion located within said cross section of said housing zone, the latter portion being entirely displaceable out of said gas cleaning zone in opposite transverse directions, and means provided by said structure outside of and at opposite sides of the gas cleaning zone, and juxtaposed with respect to the portions of the baffles displaced outside of the gas cleaning zone, to contact and to remove the dust from the baffles as they are so displaced in said opposite transverse directions, said baffles being free of each other transversely to provide free access thereabout of the contact means.

8. Apparatus for cleaning dust-laden gas, comprising a vertical housing structure providing a housing having an inlet portion for dust-laden gas and an outlet portion for cleaned gas, said housing having between said two portions a gas cleaning zone, arrays of elongated baffles located in said zone transversely of the housing in mutually spaced horizontal planes, the baffles of each array being mutually spaced and parallel and being distributed over the cross section of said zone, said arrays being displaceable in and out of said housing in opposite directions transversely of said housing and having a total transverse length at least twice the length of the array portion located within said cross section of said housing zone, the latter portion being entirely displaceable into and out of said gas cleaning zone in opposite transverse directions, and means provided by said structure at opposite sides thereof to scrape the dust from the baffles as they are so displaced, each of said means providing scraping apertures through which individual baffles pass, said baffles being free of each other transversely to provide free access thereabout of the scraping apertures.

9. Apparatus for cleaning dust-laden gas, comprising a vertical housing structure providing a housing having an inlet portion for dust-laden gas and an outlet portion for cleaned gas, said housing having between said two portions a gas cleaning zone, arrays of elongated baffles located in said zone transversely of the housing in mutually spaced horizontal planes, the baffles of each array being mutually spaced and parallel and being distributed over the cross section of said zone, said arrays being displaceable in and out of said housing in opposite directions transversely of said housing and having a total transverse length at least twice the length of the array portion located within said cross section of said housing zone, the latter portion being entirely displaceable into and out of said gas cleaning zone in opposite transverse directions, and means provided by said structure at opposite sides thereof to scrape the dust from the baffles as they are so displaced, each of said means providing scraping apertures through which individual baffles pass, said baffles being free of each other transversely to provide free access thereabout of the scraping apertures and two opposite vertical apertured partitions within the housing and separating the gas cleaning zone from the respective means providing scraping apertures, the apertures of said partitions providing clearance for passage of the dust on said baffles, said partitions forming conduits to receive the dust scraped off the baffles by said means providing scraping apertures, and dust discharge ducts extending from said conduits to the outside of the housing.

10. Apparatus for the mechanical cleaning of dust-laden gas, particularly hot gas, which comprises a housing having an inlet portion for dust-laden gas and an outlet portion for cleaned gas, filter means transversely disposed within said housing and consisting of arrays of elongated parallel baffle elements of curved outline spaced from each other within each array and transversely distributed over the entire cross section of said housing, said arrays being mounted in at least five respectively different planes spaced from each other between said inlet and outlet portions, the spacing between the elements within each plane being at least equal to the transverse thickness of the elements of that plane, the spacing between adjacent planes being a multiple of the transverse thickness of the elements of said adjacent planes, the elements of adjacent arrays being transversely displaced, the said thicknesses of the respective elements decreasing in the flow direction, said arrays being displaceable in and out of said housing in opposite directions transversely of said housing and having a total transverse length at least twice the length of the array portion located within said cross section of said housing zone, the latter portion being entirely displaceable into and out of said gas cleaning zone, in opposite transverse directions, and means provided by said structure at opposite sides thereof to scrape the dust from the baffles as they are so displaced, each of said means providing scraping apertures through which individual baffles pass, said baffles being free of each other transversely to provide free access thereabout of the scraping apertures.

11. Apparatus for the mechanical cleaning of dust-laden gas, particularly hot gas, which comprises a housing having an inlet portion for dust-laden gas and an outlet portion for cleaned gas, filter means transversely disposed within said housing and consisting of arrays of elongated parallel baffle elements of curved outline spaced from each other within each array and transversely distributed over the entire cross section of said housing, said arrays being mounted in at least five respectively different planes spaced from each other between said inlet and outlet portions, the spacing between the elements within each plane being at least equal to the transverse thicknesses of the elements of that plane, the spacing between adjacent planes being a multiple of the transverse thicknesses of the elements of said adjacent planes, the elements of adjacents arrays being transversely displaced, the said thicknesses of the respective elements decreasing in the flow direction, said arrays being displaceable in and out of said housing in opposite directions transversely of said housing and having a total transverse length at least twice the length of the array portion located within said cross section of said housing zone, the latter portion being entirely displaceable into and out of said gas cleaning zone in opposite transverse directions, and means provided by said structure at opposite sides thereof to scrape the dust from the baffles as they are so displaced, each of said means providing scraping apertures through which individual baffles pass, said baffles being free of each other transversely to provide free access thereabout of the scraping apertures, and two opposite vertical apertured partitions within the housing and separating the gas cleaning zone from the respective means providing scraping apertures, the apertures of said partitions providing clearance for passage of the dust on said baffles, said partitions forming conduits to receive the dust scraped off the baffles by said means providing scraping apertures, and dust discharge ducts extending from said conduits to the outside of the housing.

12. The apparatus defined in claim 2 in which the diameter of the baffle elements in the entrance plane is at least twice as large as the diameter in the exit plane, the diameter being between 0.5 and 20 mm.

13. The apparatus defined in claim 2, in which the cross section of the housing section containing the baffle elements is narrower than the gas inlet portion leading to said housing section, to facilitate obtaining high velocities in the latter, the baffle elements being stream-lined.

14. The apparatus defined in claim 2, in which the cross-section of the housing section containing the baffle elements is narrower than the gas inlet portion leading to said housing section, to facilitate obtaining high velocities in the latter.

15. Apparatus for the mechanical cleaning of dust-laden gas, comprising a housing having an inlet portion for dust-laden gas and an outlet portion for cleaned gas, said housing having between said two portions a zone of a narrower cross section than said portions so as to form a nozzle structure together with said portions, filter means disposed in said zone of said housing and comprising arrays of parallel free wires spaced from each other within said array and distributed over the cross section of said housing zone, said arrays being located in different respective planes spaced from each other between said inlet and outlet portions, and scraper means mechanically engageable with said respective wires for removing adhering dust therefrom, said wires being free of each other laterally to provide free access thereabout of the scraper means, said wires having an air-foil cross section tapering in the direction of the gas flow.

References Cited in the file of this patent

UNITED STATES PATENTS

| | | |
|---|---|---|
| 858,607 | Krautzberger | July 2, 1907 |
| 1,436,569 | Boerum | Nov. 21, 1922 |
| 1,484,260 | Gibbs | Feb. 19, 1924 |
| 1,582,499 | Zopf | Apr. 27, 1926 |
| 1,632,813 | Wittemeier | June 21, 1927 |
| 2,630,878 | Hopper et al. | Mar. 10, 1953 |

FOREIGN PATENTS

| | | |
|---|---|---|
| 10,029 | Great Britain | Nov. 23, 1911 |
| 190,550 | Great Britain | Dec. 27, 1922 |
| 746,886 | Germany | Aug. 28, 1944 |